(12) United States Patent
Gutcher et al.

(10) Patent No.: US 8,572,497 B2
(45) Date of Patent: Oct. 29, 2013

(54) METHOD AND SYSTEM FOR EXCHANGING CONTEXTUAL KEYS

(75) Inventors: James R. Gutcher, Sammamish, WA (US); Philip Edholm, Pleasanton, CA (US)

(73) Assignee: Avaya Inc., Basking Ridge, NJ (US)

( * ) Notice: Subject to any disclaimer, the term of this patent is extended or adjusted under 35 U.S.C. 154(b) by 336 days.

(21) Appl. No.: 13/113,448

(22) Filed: May 23, 2011

(65) Prior Publication Data

US 2012/0304076 A1 Nov. 29, 2012

(51) Int. Cl.
*G06F 3/00* (2006.01)
*G06F 15/16* (2006.01)

(52) U.S. Cl.
USPC ........... 715/753; 715/733; 715/751; 707/705; 709/204; 709/200; 709/217

(58) Field of Classification Search
USPC .......... 715/733, 751, 753, 764, 765; 707/705; 709/200, 204, 212, 216, 217
See application file for complete search history.

(56) References Cited

U.S. PATENT DOCUMENTS

| | | | |
|---|---|---|---|
| 7,627,565 B2 | 12/2009 | Budzik et al. | |
| 2010/0049808 A1* | 2/2010 | Rosenberg | 709/206 |
| 2010/0205190 A1 | 8/2010 | Morris et al. | |
| 2010/0217813 A1* | 8/2010 | Lederer | 709/206 |
| 2010/0235354 A1 | 9/2010 | Gargaro et al. | |

* cited by examiner

*Primary Examiner* — Xiomar L Bautista
(74) *Attorney, Agent, or Firm* — Withrow & Terranova, PLLC (57) ABSTRACT

A method and device for presenting contextual data to a participant in a collaboration. A first computing device determines that a first participant associated with the first computing device is participating in a communications session with a second participant associated with a second computing device. The first computing device determines a first plurality of contextual keys. The first computing device receives a second plurality of contextual keys from the second computing device. The first computing device identifies a plurality of contextual items based on the first plurality of contextual keys and the second plurality of contextual keys, and presents a user interface depicting a plurality of contextual item references, wherein each contextual item reference corresponds to one of the plurality of contextual items.

20 Claims, 9 Drawing Sheets

METHOD AND SYSTEM FOR EXCHANGING CONTEXTUAL KEYS

FIELD OF THE DISCLOSURE

Embodiments disclosed herein relate generally to a collaboration environment, and in particular to the exchange of contextual keys among computing devices involved in a collaboration.

BACKGROUND

Integration of computers and communications devices has greatly facilitated business collaboration, such as a multi-party conference call. It is now common for a single device to serve as both a computer and a communications device, or for a computer to be tightly coupled to a communications device such that the computer can control the communications device. For example, in response to user input, a computer may cause the communications device to initiate a telephone call. Such integration facilitates a participant's ability to simultaneously participate in a conference call while accessing, analyzing, and/or modifying data relevant to the conference call. Such integration also raises interesting possibilities for automatically identifying, obtaining, and presenting to the participant information that may be relevant to the participant based on determined attributes of the conference call.

SUMMARY

Embodiments herein relate to the exchange of contextual keys among computing devices during a communications session. The contextual keys may be used by the computing devices to automatically filter, search, identify, and present contextual items that may be relevant to a participant based on an identified attribute of the communications session, concurrently while the participant is participating in the communications session. The exchange of contextual keys among participants in a communications session broadens the domain of information, such as the contextual items, that may be identified, resulting in more relevant and more useful information being presented to the participant during the communications session.

According to one embodiment, a first computing device determines that a first participant associated with the first computing device is participating in a communications session with a second participant associated with a second computing device. The first computing device may comprise, for example, a first communications device, and the second computing device may comprise, for example, a second communications device. The first communications device determines a first plurality of contextual keys based on an attribute associated with the communications session. The first communications device receives a second plurality of contextual keys from the second communications device. Based on the first plurality of contextual keys and the second plurality of contextual keys, the first communications device identifies a plurality of contextual items. The contextual items may comprise, for example, one or more documents, calendar events, contacts, or emails, or any attribute data associated therewith. A user interface is presented which depicts contextual item references that correspond to the plurality of contextual items. In one embodiment, the contextual item references may be user selectable such that when a contextual item reference is selected, the corresponding contextual item is accessed, and the contents of the contextual item are displayed in the user interface.

In another embodiment, the first computing device may comprise a first server that is communicatively coupled to a first communications device and the second computing device may comprise a second server that is communicatively coupled to a second communications device.

In one embodiment, the first plurality of contextual keys may be determined based on one or more of an attribute of a calendar event corresponding to the communications session, such as an identity of a participant of the communications session; a time or date of the communications session; or an identified subject of the communications session; or on an attribute of a document identified as being relevant to the communications session. For example, in one embodiment, a first contextual key of the first plurality of contextual keys may comprise an identity of the second participant. A second contextual key of the first plurality of contextual keys may comprise a subject keyword associated with a subject of the communications session, and a third contextual key of the first plurality of contextual keys may comprise a first document keyword associated with a first document that is identified by the first participant as being relevant to the communications session.

In another embodiment, the first and second communications devices continually, during the communications session, determine contextual keys based on communications occurring during the communications session. Such determined contextual keys are continually exchanged between the first and second communications devices and are used to identify contextual items during the communications session. The user interface may be continually updated with additional contextual item references depicting the contextual items, such that the first and second participants may easily access such contextual items during the communications session.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments herein relate to the exchange of contextual keys among computing devices during a communications session. The contextual keys may be used by the computing devices to automatically filter, search, identify, and present contextual items that may be relevant to the participants in the communications session based on an identified attribute of the communications session, concurrently while the participants are participating in the communications session.

As used herein, the phrase "communications session" refers to a real-time exchange of communications between at least two participants, such as a telephone or conference call, which has a finite duration denoted directly or indirectly by a beginning of the communications session and an ending of the communications session. "Contextual data" refers to information that is determined, either correctly or incorrectly, as being potentially relevant to the context of the communications session. "Contextual item" refers to an actual instance of contextual data in a particular form, such as a document, a database record, a contact from a participant's address or contacts list, a calendar event, an email, or the like.

Figure 1:
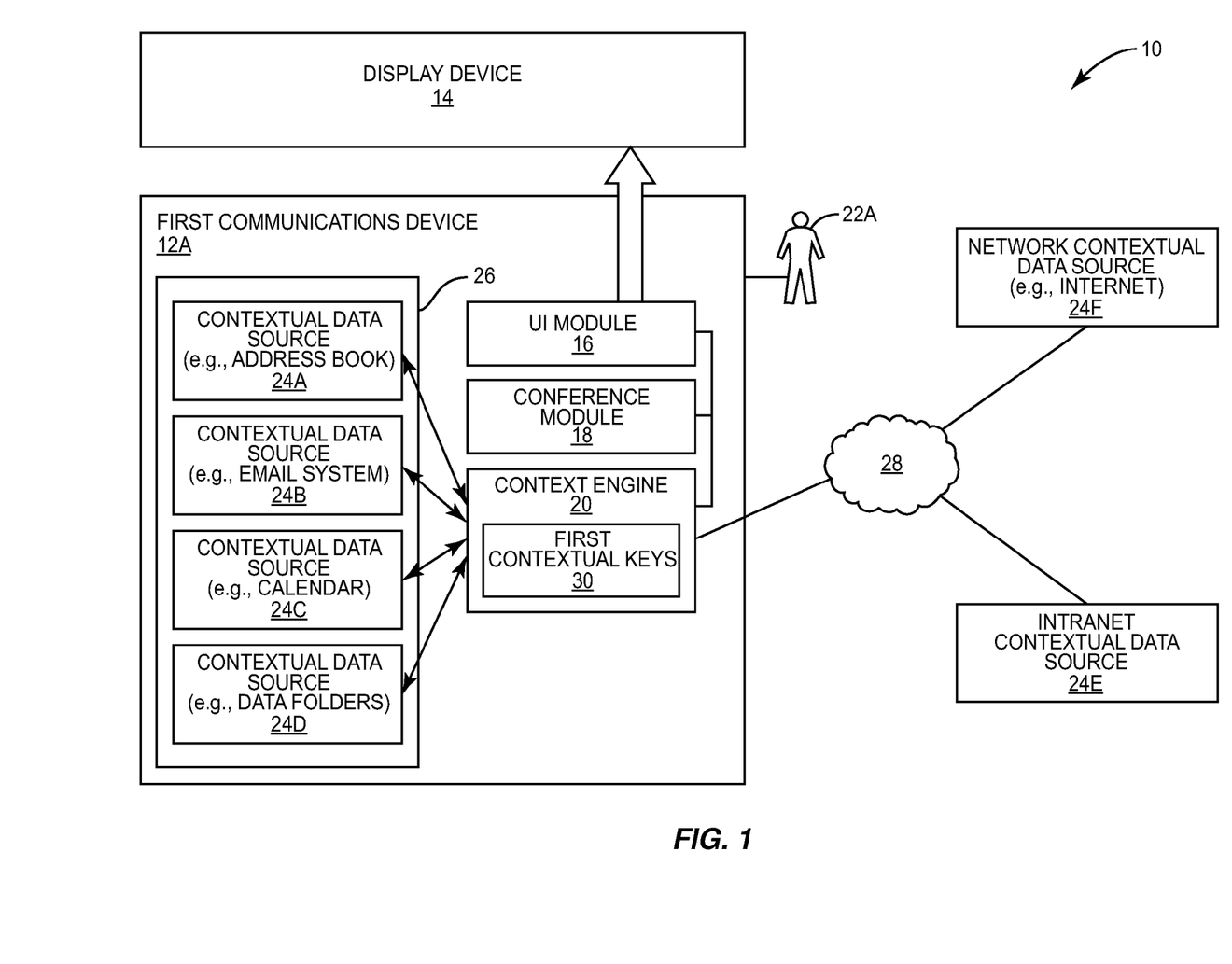
FIG. 1 is a block diagram of an exemplary system in which aspects of the embodiments disclosed herein may be practiced.

FIG. 1 is a block diagram of an exemplary system 10 in which aspects of the embodiments disclosed herein may be practiced. The system 10 includes a first communications device 12A (generally, communications device 12 or communications devices 12) which includes an integral or non-integral display device 14. The first communications device 12A may comprise, for example, a computer, a personal digital assistant (PDA), a smart phone, such as the Apple® iPhone® smart phone or the like, or any other computing device comprising a processor and capable of processing data and facilitating communications with other communications devices either directly or indirectly.

While the communications devices 12 will, for purposes of illustration, be discussed herein as a single computing device, it will be apparent that certain functionality may be distributed among a variety of different but associated computing devices without departing from the scope of the disclosure. For example, the communications devices 12 could comprise thin client devices that enable the functionality described herein in conjunction with communicatively coupled computing devices, such as workstation or server computing devices, such that some of the functionality described herein is performed on the thin client devices and other functionality on the communicatively coupled devices.

The first communications device 12A also includes certain functionality implemented by a user interface (UI) module 16, a conference module 18, and a context engine 20 that will be discussed in greater detail herein. While the UI module 16, the conference module 18, and the context engine 20 are shown separately for purposes of illustration, functionality implemented by any of such elements may be divided differently than as described herein, may be implemented in a single module, may be implemented in more than three modules, or may be implemented in any combination of these alternatives. Consequently, functionality implemented by any of such elements may be ascribed herein to the first communications device generally rather than to the particular element. The use of ordinal adjectives herein, such as first, second, and third, prior to a reference to an element, such as the first communications device 12A, does not imply an importance or priority, and is merely used to distinguish between multiple elements that would otherwise have the same label.

The first communications device 12A is associated with a first participant 22A (generally, participant 22 or participants 22). This association means that the first participant 22A uses the first communications device 12A for purposes of communication and other data processing activity. Generally, the UI module 16 is responsible for generating and displaying a user interface on the display device 14, and determining subsequent user interactions with the user interface by the first participant 22A. The conference module 18 may be responsible for functionality associated with hosting a communications session, such as a conference call, or for otherwise participating in a communications session hosted by another communications device 12. The context engine 20 is responsible for identifying contextual items from one or more contextual data sources, such as local contextual data sources 24A, 24B, 24C, 24D, intranet contextual data source 24E, or network contextual data source 24F (generally, contextual data sources 24), based on identified contextual keys.

The contextual data source 24A may comprise, for example, an address book comprising one or more contacts identifying individuals with whom the first participant 22A may desire to communicate. The contextual data source 24B may comprise, for example, an email system that contains emails addressed to or sent by the first participant 22A. The contextual data source 24C may comprise, for example, a calendar which contains calendar events identifying meetings involving the first participant 22A. The contextual data source 24D may comprise, for example, data folders that contain various files, such as documents, presentations, text files, executable files, video files, audio files, and the like. The contextual data sources 24A-24D may be stored, for example, on a locally connected storage medium such as a storage device 26 that comprises as an internal hard drive. The intranet contextual data source 24E may comprise one or more enterprise intranet servers associated with an enterprise, such as a particular business entity, with which the first communications device 12 is associated. The intranet contextual data source 24E may include one or more of the types of contextual data sources described with regard to the contextual data sources 24A-24D, and may comprise additional contextual data such as, for example, html documents. The network contextual data source 24F may comprise, for example, the Internet, and may therefore include any information found on the Internet that is determined by the context engine 20 to comprise contextual data.

The first communications device 12A may access the contextual data sources 24E, 24F, and other communications devices involved in a communications session via a network 28, which may comprise one or more of a local area network (LAN), a wide area network (WAN), a telecommunications network, and the like.

In one embodiment, the context engine 20 identifies, or receives from another element such as the conference module 18, a first plurality of contextual keys 30 that is based on attributes associated with a communications session. A contextual key comprises a unit of data that may be used to identify one or more contextual items. A contextual key may comprise, for example, a word, a phrase, a date, a time, a name, a tag, or any other unit of data that may be used to identify a contextual item. The context engine 20 uses the first plurality of contextual keys 30 to initiate a search of the contextual data sources 24 to identify contextual items based on the first plurality of contextual keys 30. As discussed in greater detail herein, contextual item references which correspond to the identified contextual items may be depicted in a user interface displayed on the display device 14.

Figure 2:
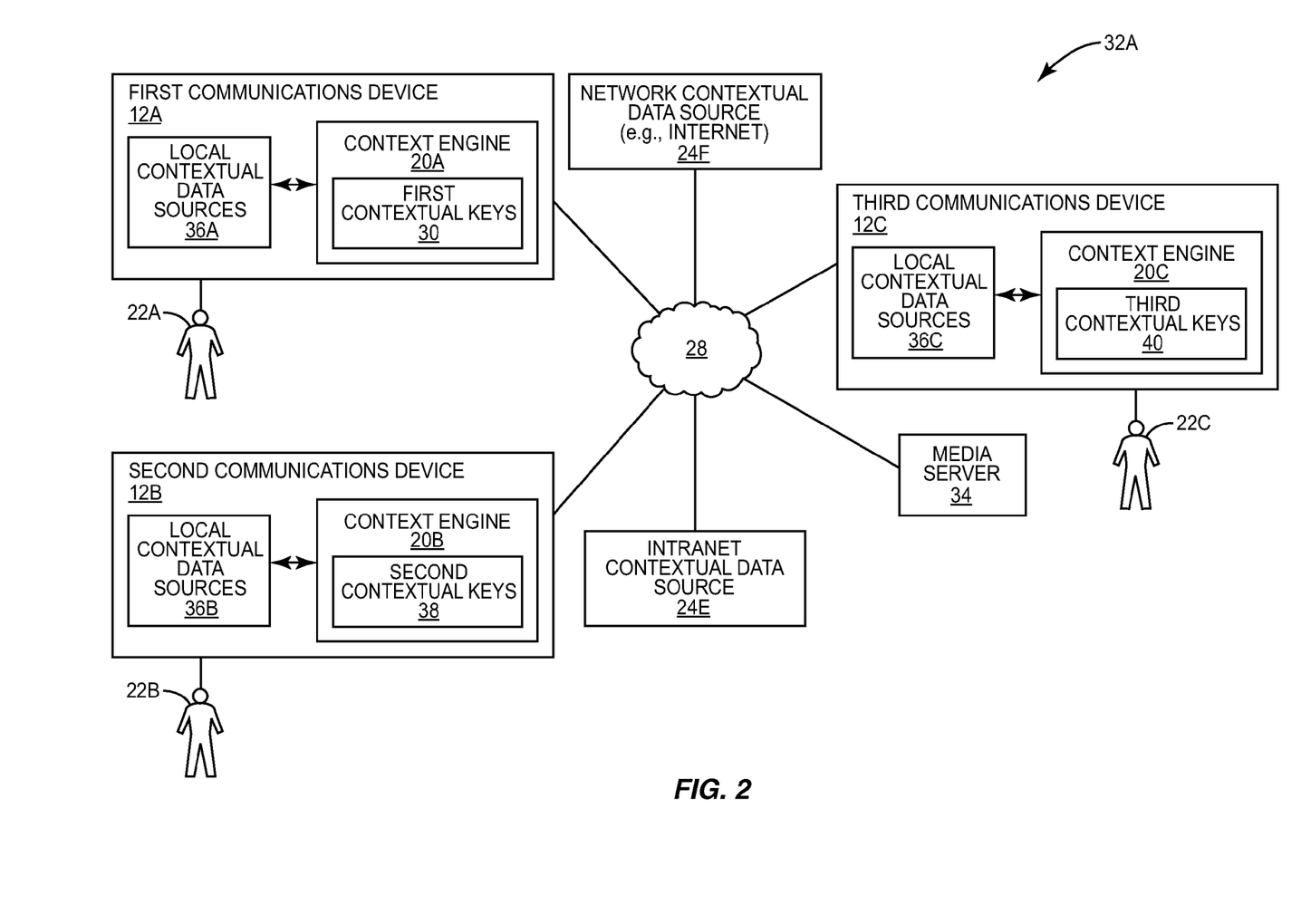
FIG. 2 is a block diagram of an exemplary system in which embodiments herein may be practiced in the context of a communications session.

FIG. 2 is a block diagram of an exemplary system 32A in which embodiments herein may be practiced in the context of a communications session. The system 32A includes the communications device 12A, a second communications device 12B, and a third communications device 12C, each coupled to the network 28 and capable of communicating with one another directly and/or indirectly via a media server 34. A second participant 22B is associated with the second communications device 12B and a third participant 22C is associated with the third communications device 12C. The media server 34 may comprise a computing device capable of anchoring a communications session between the communications devices 12. For example, the media server 34 may comprise a conference bridge to which the communications devices 12 connect in order to facilitate a communications session, such as a conference call. Such conference bridge may include a mixer to provide voice signals received from one communications device 12 to the other communications devices 12, and to perform other conventional conference mixing functionality. In another embodiment, the media server 34 may not be used, and one or more of the communications devices 12 may include the conference module 18 (FIG. 1) which may include a conference bridge and mixer capable of hosting a conference call.

The communications device 12A includes one or more local contextual data sources 36A (generally, local contextual data sources 36), which may comprise, for example the contextual data sources 24A-24D illustrated in FIG. 1. Similarly, the communications device 12B includes one or more local contextual data sources 36B, which also may comprise contextual data sources similar to the contextual data sources 24A-24D as described with respect to FIG. 1, except such local contextual data sources 36B include contextual items relevant to the second participant 22B. The communications device 12C includes one or more local contextual data sources 36C, which may comprise contextual data sources similar to the contextual data sources 24A-24D as described with respect to FIG. 1, except such local contextual data sources 36C include contextual items relevant to the third participant 22C. While only three participants 22 are discussed herein for purposes of illustration, it is apparent that a communications session may involve only two participants, or may involve any number of participants greater than two.

Figure 3:
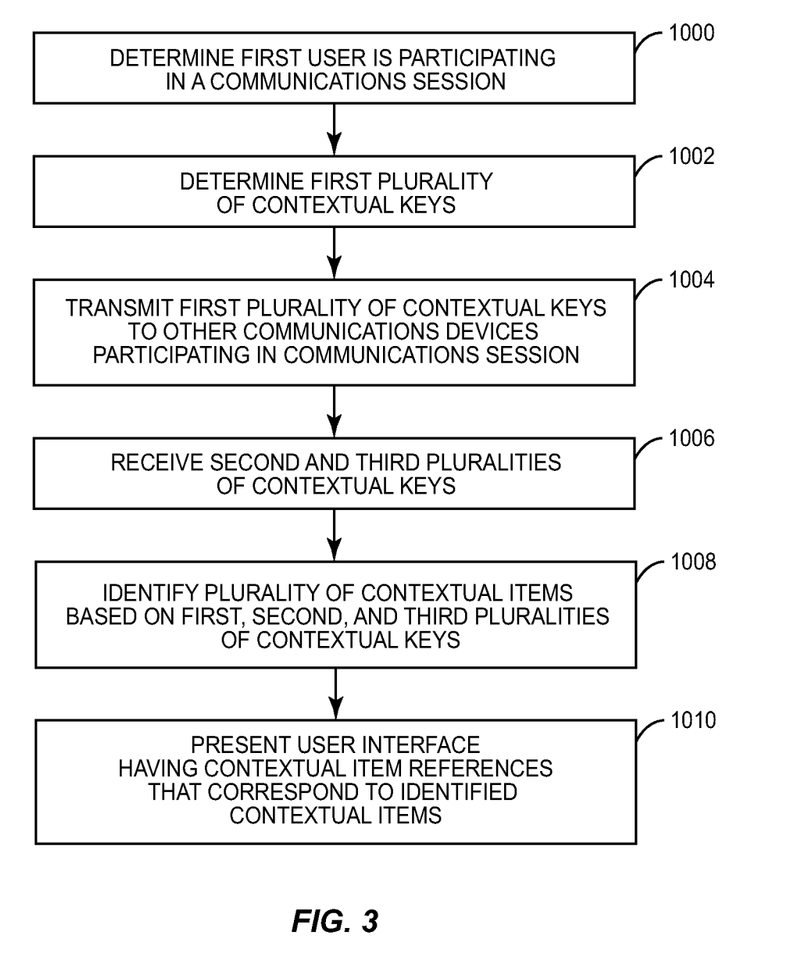
FIG. 3 is a flowchart illustrating an exemplary process for exchanging contextual keys among communications devices involved in a communications session according to one embodiment.

FIG. 3 is a flowchart illustrating an exemplary process for exchanging contextual keys among communications devices involved in a communications session according to one embodiment. FIG. 3 will be discussed in conjunction with FIG. 2. Assume, for purposes of illustration, that the participants 22 have scheduled a conference call at a particular time and date in order to discuss the development of a user interface. Details regarding the conference call may be recorded as a calendar event in calendars associated with each of the participants 22. Such calendars may compose, in part, the respective local contextual data sources 36 associated with the respective participants 22. Assume further that the first communications device 12A determines that the first participant 22A is participating in the communications session (FIG. 3, step 1000). This determination may be made in any number of ways. The first communications device 12A may periodically access the corresponding calendar of the first participant 22A and thereby determine that the communications session is scheduled to occur at the particular time and date. Alternatively, the participation by the first participant 22A in the communications session may be achieved in part by the first communications device 12A such that the first communications device 12A is aware of the communications session. For example, the first participant 22A may initiate a conference application that facilitates participation in communications sessions by the first participant 22A.

The first communications device 12A determines a first plurality of contextual keys 30 (step 1002). The first plurality of contextual keys 30 is preferably, but not necessarily, based on attributes of the communications session. Attributes of the communications session may relate to a time or date of the communications session, a location of the communications session, a subject matter or topic of the communications session, identities of participants in the communications session, documents identified as being relevant to the communications session, tags associated with documents or other contextual items, or the like. Such attributes may be determined from a number of different sources. Time and date information may be available to the first communications device 12A via an internal system clock.

While the communications session may be scheduled or ad hoc, if scheduled, other attributes associated with the communications session may be obtained, for example, from information associated with a calendar event contained in the local contextual data sources 36. For example, as discussed above, the contextual data source 36A may include a calendar with a calendar entry identifying information about the communications session. Such information may include, for example, a list of participants in the communications session; references to or attachments of documents for discussion prior to or during the communications session; or a subject line, comprising one or more words, that identifies the subject, or topic, of the communications session. Contextual keys may include one or more participant identifiers which correspond to identified participants in the communications session, one or more words derived from the subject line of the calendar event, or one or more words derived from the contents or metadata associated with documents identified as being relevant to the communications session. Other attributes of the communications session may be determined via emails contained in the contextual data source 36A that are identified as being associated with the communications session. Such emails may be identified by virtue of referring to, or being attached to, the corresponding calendar event associated with the communications session, or via information in the email that identifies the email as being associated with the calendar event, such as a subject line or text contained in the body of an email. Contextual keys identified from such an email may include words derived from the email, as well as identifiers of recipients and the sender of the email.

The first plurality of contextual keys 30 may comprise, for example, an identity of the second participant 22B, a subject keyword associated with a subject of the communications session, and a first document keyword associated with a first document identified by the first participant 22A as being relevant to the communications session. In particular, the first participant 22A may have identified the first document as being relevant to the communications session by attaching the first document to a calendar event that corresponds to the communications session.

Substantially concurrently with the first communications device 12A identifying the first plurality of contextual keys 30, the second communications device 12B identifies a second plurality of contextual keys 38, and the third communications device 12C identifies a third plurality of contextual keys 40. The second plurality of contextual keys 38 and the third plurality of contextual keys 40 may be determined in a similar manner to that described with regard to the first plurality of contextual keys 30. After identifying the first plurality of contextual keys 30, the first communications device 12A communicates the first plurality of contextual keys 30 to the second communications device 12B and the third communications device 12C (step 1004), the second communications device 12B communicates the second plurality of contextual keys 38 to the first communications device 12A and the third communications device 12C, and the third communications device 12C communicates the third plurality of contextual keys 40 to the first communications device 12A and the second communications device 12B. The first communications device 12A thus receives the second plurality of contextual keys and the third plurality of contextual keys (step 1006).

Preferably, the first plurality of contextual keys 30 differs from the second and third pluralities of contextual keys 38, 40. The second plurality of contextual keys 38 may include, for example, a second document keyword associated with a second document identified by the second participant 22B as being relevant to the communications session. In particular, the second participant 22B may have identified the second document as being relevant to the communications session by attaching the second document to a calendar event that corresponds to the communications session. The second document may differ from the first document.

The first communications device 12A then identifies a plurality of contextual items based on the first, second, and third pluralities of contextual keys 30, 38, 40 (step 1008). In particular, the first communications device 12A may initiate searches on the local contextual data sources 36A, the intranet contextual data source 24E, or the network contextual data source 24F. The searches may identify one or more contextual items based on the first, second, and third pluralities of contextual keys 30, 38, 40. As discussed previously, contextual items may comprise, for example, one or more documents, calendar events, contacts, or emails. One contextual item may be the second document identified by the second participant 22B, but not by the first participant 22A, as being relevant to the communications session, which may be located by the first communications device 12A in response to the second plurality of contextual keys 38, which included the second document keyword.

In one embodiment, the first, second, and third pluralities of contextual keys 30, 38, 40 may be prioritized relative to one another using one or more prioritization criteria prior to the identification of contextual items, and higher prioritized contextual keys may be weighted more heavily than lower prioritized contextual keys in the identification of contextual items. In one embodiment, the prioritization criteria are based on the number of occurrences of a particular contextual key among the first, second, and third pluralities of contextual keys 30, 38, 40. In other words, if the same contextual key is found in each of the pluralities of contextual keys 30, 38, 40, such contextual key may be given a higher priority than a contextual key that is found in only one of the pluralities of contextual keys 30, 38, 40.

The first communications device 12A then presents a user interface that depicts contextual item references that correspond to the identified contextual items (step 1010). Contextual item references may comprise icons, textual identifiers, images, or the like, or combinations thereof, which identify aspects of the corresponding contextual items to the first participant 22A. The contextual item references may be user selectable, such that if selected by the first participant 22A, the contextual item that corresponds to the selected contextual item reference may be accessed by the first communications device 12A, and the first communications device 12A may display the contents of the contextual item to the first participant 22A in an appropriate manner. For example, selection of a contextual item reference that corresponds to a document may result in a word processing application displaying the contents of the document. Selection of a contextual item reference that corresponds to an email may result in an email system displaying the contents of the email. Selection of a contextual item reference that corresponds to a calendar event may result in a calendar application displaying the calendar event.

The exchange of contextual keys among the communications devices 12 may occur repeatedly throughout the communications session. The communications devices 12 may periodically, based on a predetermined amount of time, redetermine contextual keys, and exchange such contextual keys, and/or may do so based upon the occurrence of an event during the communications session, such as when a new participant joins the communications session. Each exchange of contextual keys may result in the identification of additional contextual items, and updating of the user interface with contextual item references that correspond to the additional contextual items.

Figure 4:
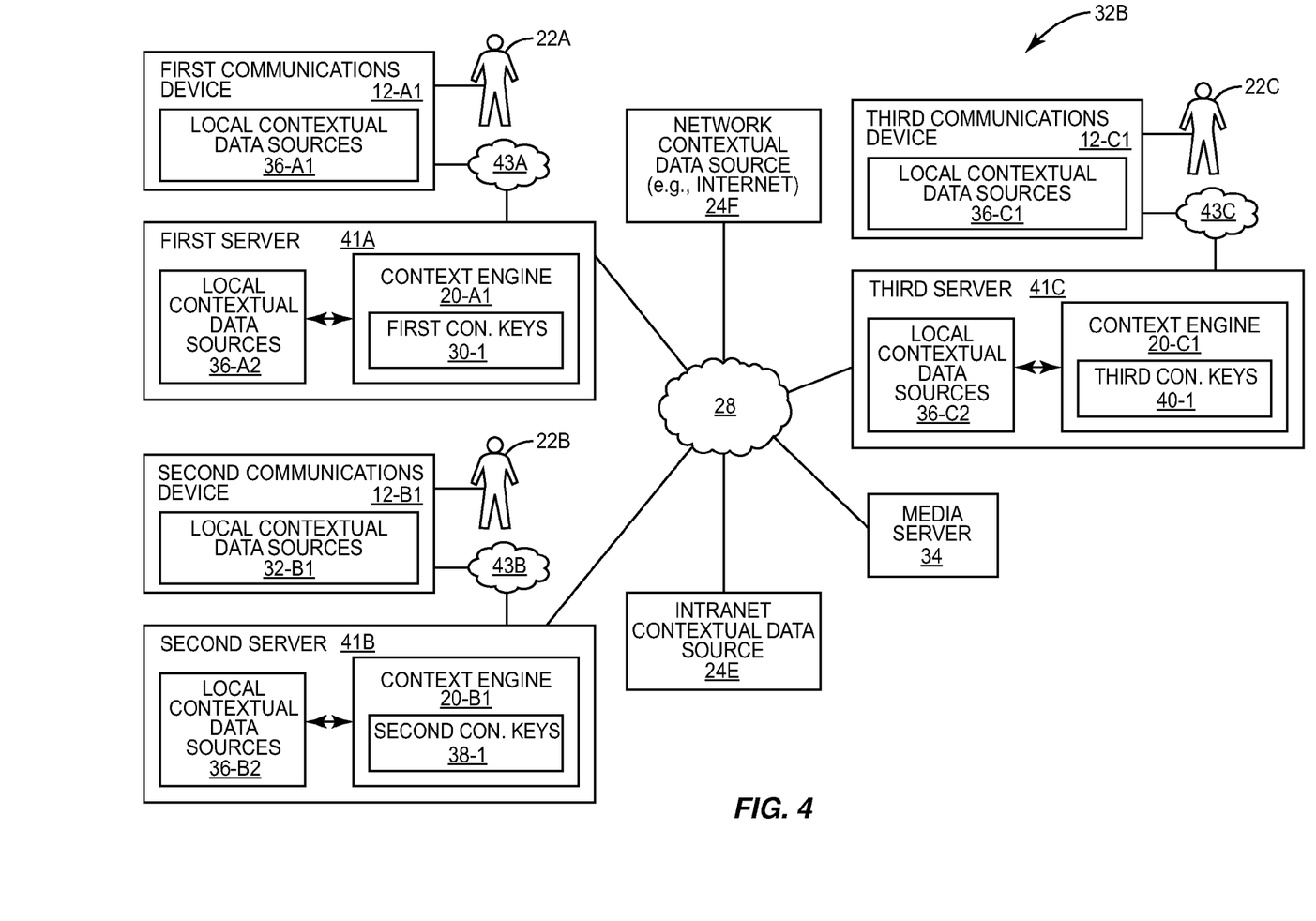
FIG. 4 is a block diagram of an exemplary system in which embodiments herein may be practiced in the context of a communications session according to another embodiment.

FIG. 4 is a block diagram of an exemplary system 32B in which embodiments herein may be practiced in the context of a communications session according to another embodiment. In this embodiment, a first communications device 12-A1 operates in conjunction with a first server 41A. The first server 41A comprises, preferably, a computing device, such as a desktop computer, that comprises a context engine 20-A1 that provides functionality similar or identical to the context engine 20A described in FIG. 2. The first server 41A communicates with the first communications device 12-A1 via a network 43A, which may comprise, for example, a local area network, a personal area network, a wide area network, or the like. The first communications device 12-A1 comprises local contextual data sources 36-A1 relevant to the first participant 22A, which may be accessible by the first server 41A. The first server 41A may also have local contextual data sources 36-A2, which may also be relevant to the first participant 22A. In this embodiment, processing associated with the generation and exchange of first contextual keys 30-1 is performed by the context engine 20-A1, rather than a context engine executing on the first communications device 12-A1.

Similarly, a second communications device 12-B1 comprising local contextual data sources 32-B1 that are relevant to the second participant 22B communicates with a second server 41B, which includes a context engine 20-B1 and local contextual data sources 36-B2. The context engine 20-B1 generates second contextual keys 38-1. A third communications device 12-C1 comprising local contextual data sources 32-C1 that are relevant to the third participant 22C communicates with a third server 41C, which includes a context engine 20-C1 and local contextual data sources 36-C2. The context engine 20-C1 generates third contextual keys 40-1. Thus, in this embodiment each participant 22A, 22B, 22C is associated not only with a communications device 12-A1, 12-A2, 12-A3, but also with a respective server 41A, 41B, 41C.

In this embodiment, the first server 41A, the second server 41B, and the third server 41C (generally, servers 41) determine respective contextual keys and exchange such contextual keys via the network 28. Similar to the process discussed above with regard to FIGS. 2 and 3, each respective server 41, upon receipt of the contextual keys from the other servers 41, identifies a plurality of contextual items based on the contextual keys. For example, the first server 41A receives the second contextual keys 38-1 from the second server 41B and the third contextual keys 40-1 from the third server 41C, and based on the first contextual keys 30-1, the second contextual keys 38-1, and the third contextual keys 40-1, identifies a plurality of contextual items from, for example, the local contextual data sources 36-A1, 36-A2, the network contextual data source 24F, and the intranet contextual data source 24E. The first server 41A then provides contextual item references that correspond to the identified contextual items to the first communications device 12-A1, to effect presentation thereon to the first participant 22A.

Figure 5:
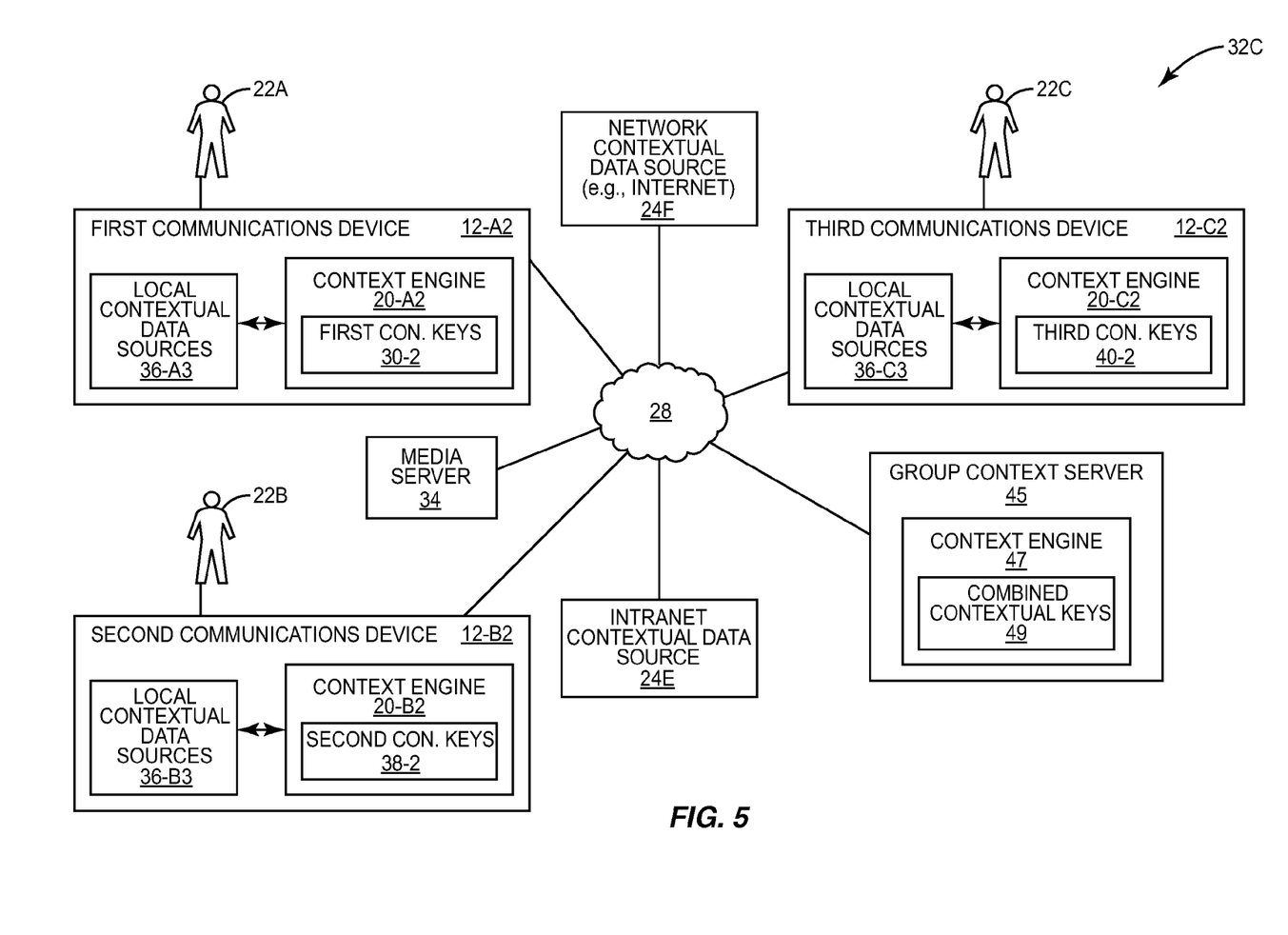
FIG. 5 is a block diagram of an exemplary system in which embodiments herein may be practiced in the context of a communications session according to yet another embodiment.

FIG. 5 is a block diagram of an exemplary system 32C in which embodiments herein may be practiced in the context of a communications session according to yet another embodiment. In this embodiment, similar to the embodiment discussed with respect to FIG. 2, communications devices 12-A2, 12-B2, and 12-C2 include corresponding context engines 20-A2, 20-B2, and 20-C2. Moreover, the communications devices 12-A2, 12-B2, and 12-C2 have corresponding local contextual data source 36-A3, 36-B3, and 36-C3, each of which includes contextual items relevant to the corresponding participant that uses the respective communications device 12-A2, 12-B2, or 12-C2. In this embodiment, however, each of the communications devices 12-A2, 12-B2, and 12-C2 provides contextual keys to a group context server 45. The group context server 45 may comprise, for example, a computing device, such as a desktop computer.

In particular, the first communications device 12-A2 provides first contextual keys 30-2 to the group context server 45, the second communications device 12-B2 provides second contextual keys 38-2 to the group context server 45, and the third communications device 12-C2 provides third contextual keys 40-2 to the group context server 45. The group context server 45 can then consolidate the first, second, and third contextual keys 30-2, 38-2, and 40-2 and provide such contextual keys to the communications devices 12-A2, 12-B2, and 12-C2. In one embodiment, the group context server 45 may also include a context engine 47 which can, based on the contextual keys 30-2, 38-2, and 40-2, also determine combined contextual keys 49, which may also be provided to the communications devices 12-A2, 12-B2, and 12-C2. The group context server 45 may also store the contextual keys 30-2, 38-2, and 40-2 such that the contextual keys 30-2, 38-2, and 40-2 may be used in a subsequent communications session between the participants 22.

Although not illustrated, it will be apparent that the embodiment discussed with regard to FIG. 5 could also be combined with the embodiment disclosed in FIG. 4, such that the first server 41A, the second server 41B, and the third server 41C provide corresponding contextual keys 30-1, 38-1, and 40-1 to the group context server 45 rather than directly to one another.

Figure 6:
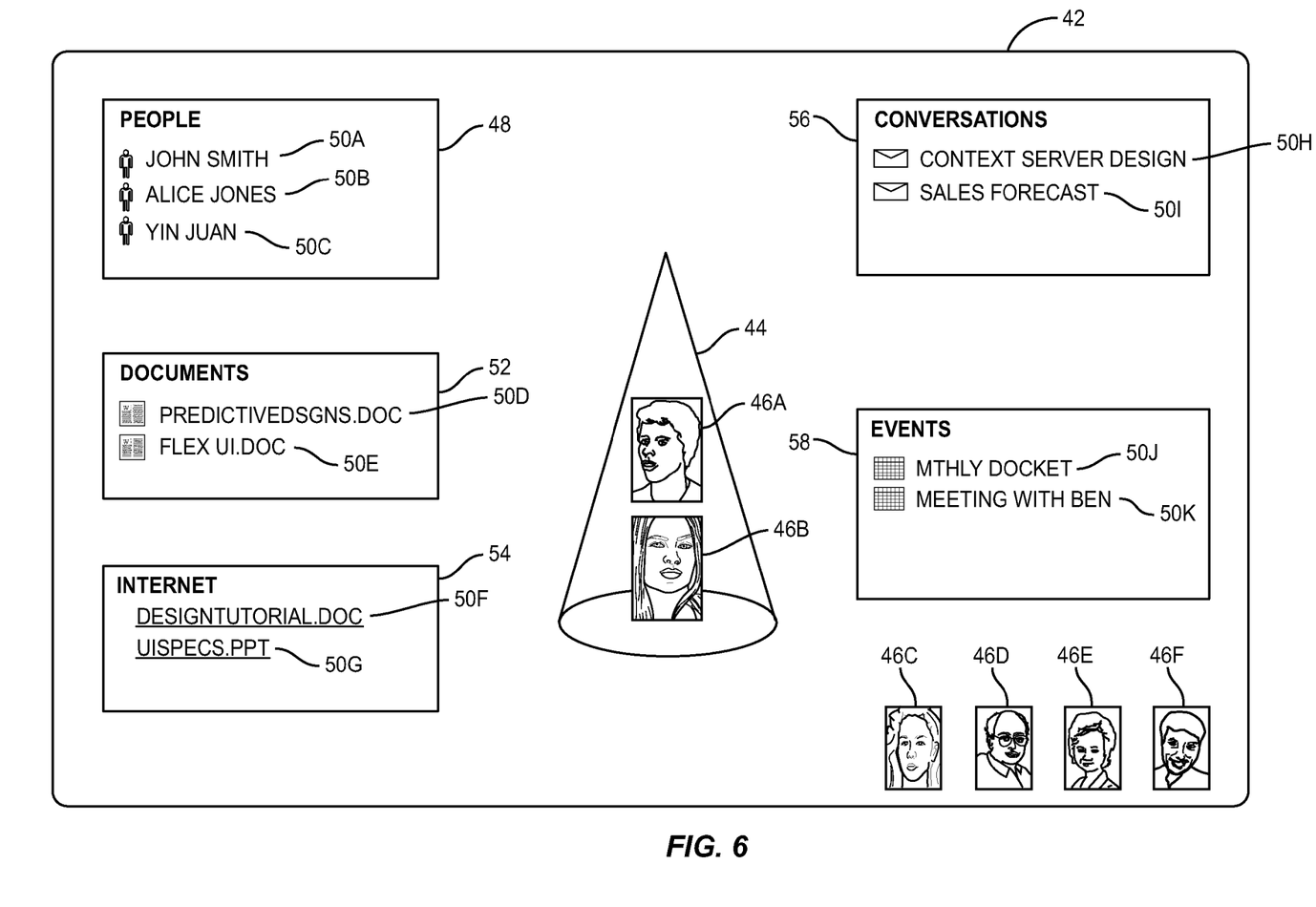
FIG. 6 illustrates an exemplary user interface suitable for depicting contextual item references according to one embodiment.

FIG. 6 illustrates an exemplary user interface 42 suitable for depicting contextual item references according to one embodiment. FIG. 6 will be discussed in conjunction with the embodiment disclosed in FIG. 2, but those of skill in the art will appreciate that the discussion is also applicable to the embodiments disclosed in FIGS. 4 and 5. The user interface 42 includes spotlight image 44 which may be used by the first participant 22A to identify to the first communications device 12A that the first participant 22A desires to initiate a conference call with the second participant 22B and the third participant 22C. For example, the first participant 22A may drag and drop icons 46A, 46B, which correspond to the second participant 22B and the third participant 22C, from a plurality of icons 46A-46F, each of which corresponds to a respective individual or entity, into the spotlight image 44. Such action may signal to the first communications device 12A to initiate a conference call with the second participant 22B and the third participant 22C. In response, the first communications device 12A may determine addressing information, such as a telephone number or session initiation protocol (SIP) identifier associated with the second communications device 12B and the third communications device 12C, and initiate communications with such devices.

In response to the initiation of the communications session, the first communications device 12A may determine the first plurality of contextual keys 30 as discussed above with regard to FIGS. 2 and 3. The first communications device 12A also receives the second and third pluralities of contextual keys 38, 40, and identifies contextual items based on the first, second, and third pluralities of contextual keys 30, 38, 40.

The user interface 42 includes a plurality of areas in which various contextual item references that correspond to the identified contextual items are depicted. A contact area 48 includes a plurality of contextual item references 50A-50C, each of which corresponds to a contextual item that comprises a contact entry in an address book of the first participant 22A. The contextual item references 50A-50C may be user selectable. For example, upon selection of the contextual item reference 50A, the user interface 42 may cause information regarding the contact "John Smith," such as address information, phone number information, and the like, to be displayed.

A documents area 52 includes a plurality of contextual item references 50D-50E, each of which corresponds to a contextual item that comprises a document. An Internet area 54 includes a plurality of contextual item references 50F-50G, each of which corresponds to a contextual item located in the network contextual data source 24F. A conversations area 56 includes a plurality of contextual item references 50H-50I, each of which corresponds to a contextual item that comprises an email, or chain of emails. An events area 58 includes a plurality of contextual item references 50J-50K, each of which corresponds to a calendar event. The first participant 22A may, while participating in the communications session, select any of the contextual item references 50A-50K to access the corresponding contextual item.

Figure 7:
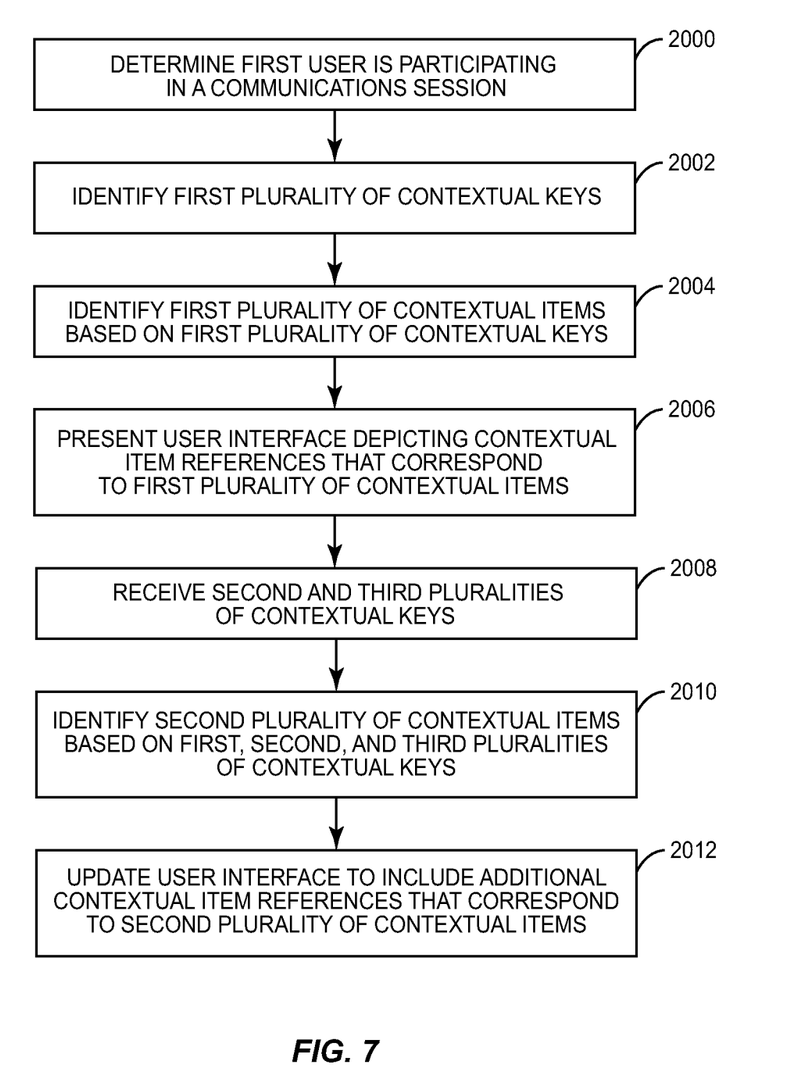
FIG. 7 is a flowchart illustrating an exemplary process for exchanging contextual keys among communications devices involved in a communications session according to another embodiment.

FIG. 7 is a flowchart illustrating an exemplary process for exchanging contextual keys among communications devices involved in a communications session according to another embodiment. In this embodiment, the contextual item references depicted in the user interface may be continually updated as the first communications device 12A continually identifies contextual items based on contextual keys. FIG. 7 will be discussed in conjunction with the embodiment disclosed in FIG. 2, but those of skill in the art will appreciate that the discussion is also applicable to the embodiments disclosed in FIGS. 4 and 5.

Initially, the first communications device 12A, as discussed above with regard to FIG. 5, determines that the first participant 22A is participating in a communications session (step 2000). In response, the first communications device 12A identifies the first plurality of contextual keys 30 (step 2002). In this embodiment, the first communications device 12A then searches the contextual data sources 24 and identifies a first plurality of contextual items based on the first plurality of contextual keys 30 only (step 2004). The first communications device 12A presents a user interface that depicts a first plurality of contextual item references that corresponds to the identified first plurality of contextual items (step 2006). Assume for purposes of illustration, that the user interface corresponds to the user interface 42 illustrated in FIG. 6, and that the contextual item references 50A-50K are the contextual item references that correspond to the identified first plurality of contextual items. The first communications device 12A receives the second plurality of contextual keys 38 and the third plurality of contextual keys 40 (step 2008). The first communications device 12A searches the contextual data sources 24 and identifies a second plurality of contextual items based on the first, second, and third pluralities of contextual keys 30, 38, 40 (step 2010). The first communications device 12A then updates the user interface 42 to include additional contextual item references that correspond to the second plurality of contextual items (step 2012).

Figure 8:
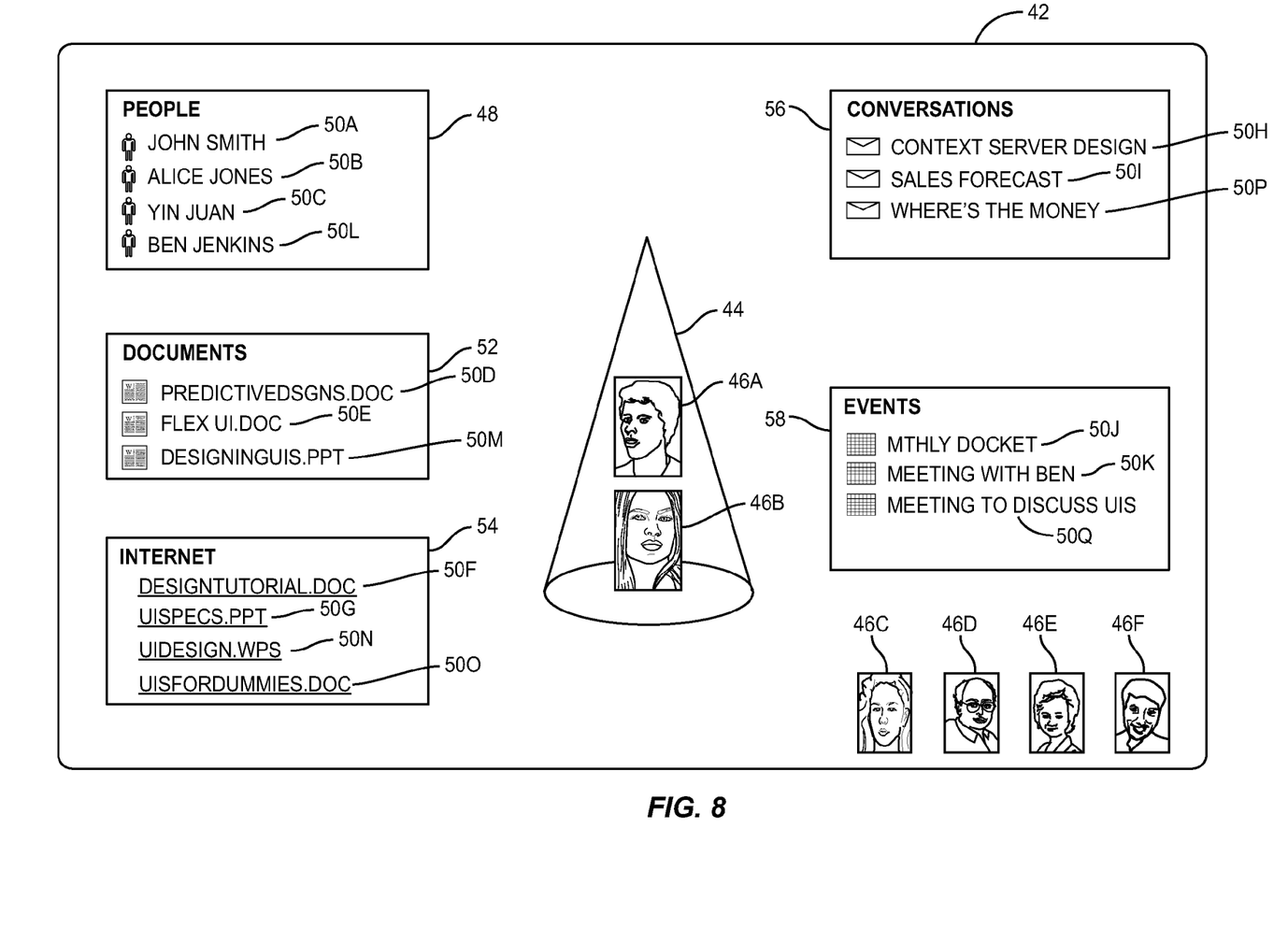
FIG. 8 illustrates the exemplary user interface illustrated in FIG. 6 as discussed with regard to FIG. 7, after the contextual items corresponding to the second plurality of contextual item references have been presented.

FIG. 8 illustrates the exemplary user interface 42 illustrated in FIG. 6 as discussed with regard to FIG. 7, after the contextual items corresponding to the second plurality of contextual items have been presented. In addition to the contextual item references 50A-50K which correspond to the first plurality of contextual items, the user interface 42 depicts additional contextual item references 50L-50Q corresponding to the second plurality of contextual items.

In another embodiment, the first communications device 12A identifies additional contextual keys based on the identified contextual items. For example, the first communications device 12A may identify a contextual item comprising a document based on the first, second, and third pluralities of contextual keys 30, 38, 40. The first communications device 12A may access the document and derive a fourth plurality of contextual keys based on the document. The fourth plurality of contextual keys could be based on metadata associated with the document, such as a tag, a creation date, an author, or the like, or on the content of the document. The first communications device 12A may then search the contextual data sources 24 based on the first, second, third, and fourth pluralities of contextual keys, or any combination thereof, and identify additional contextual items. The first communications device 12A may then update the user interface 42 to depict additional contextual item references that correspond to the additional contextual items. The first communications device 12A may also communicate the fourth plurality of contextual keys to the second communications device 12B and the third communications device 12C.

Figure 9:
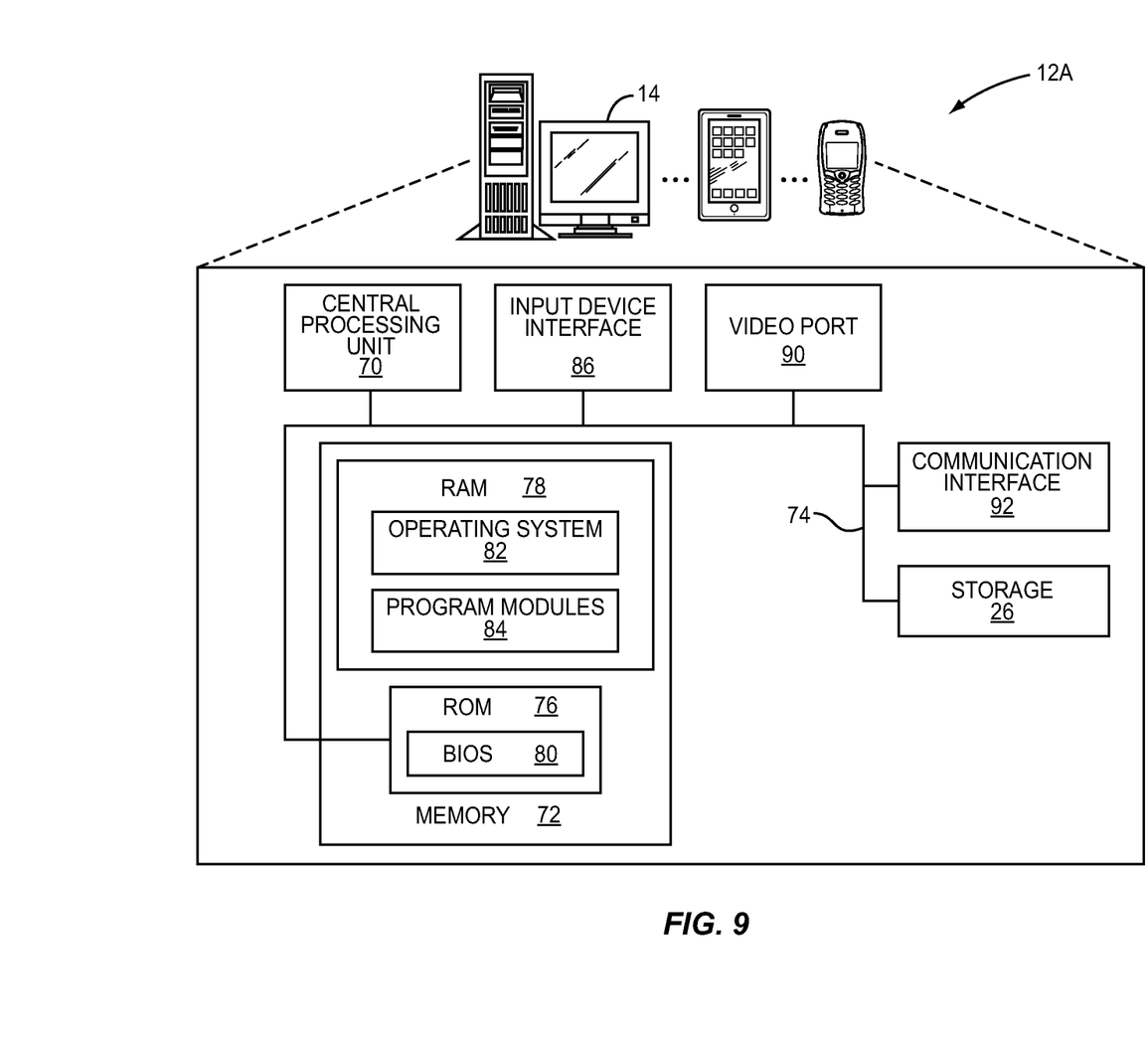
FIG. 9 illustrates an exemplary first communications device according to one embodiment.

FIG. 9 illustrates the exemplary first communications device 12A according to one embodiment. The first communications device 12A may comprise, for example, a laptop computer; a desktop computer; a personal digital assistant (PDA); a smart phone, such as the Apple® iPhone® smart phone or the like; or any other computing device comprising a processor and capable of processing data and facilitating communications with other communications devices 12 either directly or indirectly. In addition to components discussed previously herein, the exemplary first communications device 12A may also include a processor, such as a central processing unit 70, a system memory 72, and a system bus 74. The system bus 74 provides an interface for system components including, but not limited to, the system memory 72 and the central processing unit 70. The central processing unit 70 can be any of various commercially available or proprietary processors. Dual microprocessors and other multi-processor architectures may also be employed as the central processing unit 70.

The system bus 74 may be any of several types of bus structures that may further interconnect to a memory bus (with or without a memory controller), a peripheral bus, and/or a local bus using any of a variety of commercially available bus architectures. The system memory 72 may include non-volatile memory 76 (e.g., read only memory (ROM), erasable programmable read only memory (EPROM), electrically erasable programmable read only memory (EEPROM), etc.) and/or volatile memory 78 (e.g., random access memory (RAM)). A basic input/output system (BIOS) 80 may be stored in the non-volatile memory 76, and can include the basic routines that help to transfer information between elements within the first communications device 12A. The volatile memory 78 may also include a high-speed RAM, such as static RAM, for caching data.

The first communications device 12A may further include the storage device 26, which may comprise, for example, an internal hard disk drive (HDD) (e.g., enhanced integrated drive electronics (EIDE) or serial advanced technology attachment (SATA)) for storage, flash memory, or the like. The local contextual data sources 24A, 24B, 24C, 24D, for example, may be stored in the storage device 26. The storage device 26 and associated computer-readable and computer-usable media provide non-volatile storage of data, data structures, computer-executable instructions, and so forth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the storage device 26 and in the volatile memory 78, including an operating system 82 and one or more program modules 84, which may implement the functionality described herein in whole or in part, including, for example, functionality associated with the UI module 16, the conference module 18, the context engine 20, or other processing and functionality described herein. It is to be appreciated that the embodiments can be implemented with various commercially available operating systems 82 or combinations of operating systems 82.

All or a portion of the embodiments may be implemented as a computer program product, such as a non-transitory computer-usable or computer-readable medium having a computer-readable program code embodied therein. The computer-readable program code can include software instructions for implementing the functionality of the embodiments described herein when executed on the central processing unit 70. The central processing unit 70, in conjunction with the program modules 84 in the volatile memory 78, may serve as a control system for the first communications device 12A that is configured to, or adapted to, implement the functionality described herein.

An administrator may be able to enter commands and information into the first communications device 12A through one or more input devices, such as, for example, a touch sensitive display (not illustrated); a keyboard (not illustrated); or a pointing device, such as a mouse (not illustrated).

Other input devices (not illustrated) may include a microphone, an infrared (IR) remote control, a joystick, a game pad, a stylus pen, or the like. These and other input devices are often connected to the central processing unit 70 through an input device interface 86 that is coupled to the system bus 74, but can be connected by other interfaces such as a parallel port, an IEEE 1394 serial port, a game port, a universal serial bus (USB) port, an IR interface, etc.

The first communications device 12A may drive a separate or integral display device 14, which may also be connected to the system bus 74 via an interface, such as a video port 90. The first communications device 12A preferably includes a communication interface 92 for communicating with the network 28 (FIG. 1).

Servers discussed herein, such as the first server 41A, the second server 41B, the third server 41C, and the group context server 45, may comprise similar or identical components to those described above with regard to FIG. 9. In particular, such servers may include a processor, a system bus, various types of memory, communications interfaces suitable for communicating with other computing devices, and the like. However, such servers typically would include software instructions, such as program code, stored on a non-transitory computer-readable medium, such as a hard drive or the like, which, when executed by a central processing unit, would implement the functionality described herein with respect to such servers.

Those skilled in the art will recognize improvements and modifications to the preferred embodiments of the present disclosure. All such improvements and modifications are considered within the scope of the concepts disclosed herein and the claims that follow.

What is claimed is:

1. A method for presenting contextual data to a participant in a collaboration, comprising:
   determining, by a first computing device, that a first participant associated with the first computing device is participating in a communications session with a second participant associated with a second computing device;
   determining, by the first computing device, a first plurality of contextual keys;
   receiving, by the first computing device, a second plurality of contextual keys from the second computing device;
   identifying, by the first computing device, a plurality of contextual items based on the first plurality of contextual keys and the second plurality of contextual keys; and
   effecting presentation, by the first computing device, of a user interface depicting a plurality of contextual item references, each contextual item reference corresponding to one of the plurality of contextual items.

2. The method of claim 1, wherein determining the first plurality of contextual keys comprises determining a plurality of attributes associated with the communications session, and wherein the first plurality of contextual keys are based on the plurality of attributes.

3. The method of claim 2, wherein a first contextual key of the first plurality of contextual keys comprises an identity of the second participant, a second contextual key of the first plurality of contextual keys comprises a subject keyword associated with a subject of the communications session, and a third contextual key of the first plurality of contextual keys comprises a first document keyword associated with a first document identified by the first participant as being relevant to the communications session.

4. The method of claim 3, wherein the second plurality of contextual keys comprises a second document keyword associated with a second document identified by the second participant as being relevant to the communications session, the first document keyword being different from the second document keyword.

5. The method of claim 4, wherein the plurality of contextual items comprises the second document.

6. The method of claim 1, wherein identifying the plurality of contextual items based on the first plurality of contextual keys and the second plurality of contextual keys further comprises initiating a search of a plurality of items stored on one or more of a locally connected storage medium, an intranet server, and the Internet based on the first plurality of contextual keys and the second plurality of contextual keys.

7. The method of claim 1, wherein the plurality of contextual items comprises a document, a first contact of a plurality of contacts in a contacts list associated with the first participant, and a first email of a plurality of emails addressed to the first participant.

8. The method of claim 7, further comprising:
   determining a third plurality of contextual keys based on the document;
   identifying a second plurality of contextual items based on the first plurality of contextual keys, the second plurality of contextual keys, and the third plurality of contextual keys; and
   updating the user interface to comprise a second plurality of contextual item references, each of the second plurality of contextual item references corresponding to one of the second plurality of contextual items.

9. The method of claim 1, wherein a third participant associated with a third computing device is participating in the communications session, further comprising:
   receiving, by the first computing device, a third plurality of contextual keys from the third computing device; and
   wherein identifying, by the first computing device, the plurality of contextual items based on the first plurality of contextual keys and the second plurality of contextual keys further comprises identifying the plurality of contextual items based on the first plurality of contextual keys, the second plurality of contextual keys, and the third plurality of contextual keys.

10. The method of claim 9, wherein each of the first plurality of contextual keys, the second plurality of contextual keys, and the third plurality of contextual keys is different from the other pluralities of contextual keys.

11. The method of claim 1, wherein the plurality of contextual item references are user selectable, further comprising:
   receiving a selection of a particular contextual item reference of the plurality of contextual item references;
   accessing the contextual item referred to by the particular contextual item reference; and
   presenting, in the user interface, the contextual item in response to the selection.

12. The method of claim 1, wherein determining the first plurality of contextual keys comprises:
   accessing a calendar associated with the first participant based on a time of the communications session;
   determining that a calendar event corresponds to the time;
   accessing attribute data associated with the calendar event, including text identifying a subject of the calendar event and a participant list identifying participants in the calendar event;
   wherein a first contextual key of the first plurality of contextual keys comprises a keyword selected from the text identifying the subject, and a second contextual key of the first plurality of contextual keys comprises an identity of a participant identified in the participant list.

13. A method for presenting contextual data to a participant in a collaboration, comprising:
- determining, by a first communications device, a first plurality of contextual keys based on information associated with a communications session involving a first participant associated with the first communications device and a second participant associated with a second communications device;
- identifying, by the first communications device, a first plurality of contextual items based on the first plurality of contextual keys;
- presenting, by the first communications device, a user interface comprising a first plurality of contextual item references, each contextual item reference corresponding to one of the first plurality of contextual items;
- receiving, by the first communications device, a second plurality of contextual keys from the second communications device;
- identifying, by the first communications device, a second plurality of contextual items based on the first plurality of contextual keys and the second plurality of contextual keys; and
- presenting the user interface comprising the first plurality of contextual item references and a second plurality of contextual item references, each of the second plurality of contextual item references corresponding to one of the second plurality of contextual items.

14. The method of claim 13, wherein a first contextual key of the first plurality of contextual keys comprises an identity of the second participant, a second contextual key of the first plurality of contextual keys comprises a subject keyword associated with a subject of the communications session, and a third contextual key of the first plurality of contextual keys comprises a first document keyword associated with a first document identified by the first participant as being relevant to the communications session.

15. The method of claim 13, wherein identifying the first plurality of contextual items based on the first plurality of contextual keys and the second plurality of contextual keys further comprises initiating a search of a plurality of items stored on the Internet based on the first plurality of contextual keys and the second plurality of contextual keys.

16. The method of claim 13, wherein the first plurality of contextual items comprises a document, a first contact of a plurality of contacts in a contacts list associated with the first participant, and a first email of a plurality of emails addressed to the first participant.

17. The method of claim 16, further comprising:
- determining a third plurality of contextual keys based on the document;
- identifying a third plurality of contextual items based on the first plurality of contextual keys, the second plurality of contextual keys, and the third plurality of contextual keys; and
- presenting the user interface comprising the first plurality of contextual item references, the second plurality of contextual item references, and a third plurality of contextual item references, each of the third plurality of contextual item references corresponding to one of the third plurality of contextual items.

18. A first communications device for presenting contextual data to a participant in a collaboration, comprising:
- a communication interface adapted to communicate with a network; and
- a control system comprising a processor and configured to:
  - determine that a first participant associated with the first communications device is participating in a communications session with a second participant associated with a second communications device;
  - determine a first plurality of contextual keys;
  - receive a second plurality of contextual keys from the second communications device;
  - identify a plurality of contextual items based on the first plurality of contextual keys and the second plurality of contextual keys; and
  - present a user interface comprising a plurality of contextual item references, each contextual item reference corresponding to one of the plurality of contextual items.

19. The first communications device of claim 18, wherein a first contextual key of the first plurality of contextual keys comprises an identity of the second participant, a second contextual key of the first plurality of contextual keys comprises a subject keyword associated with a subject of the communications session, and a third contextual key of the first plurality of contextual keys comprises a first document keyword associated with a first document identified by the first participant as being relevant to the communications session.

20. The first communications device of claim 18, wherein the plurality of contextual items comprises a document, a first contact of a plurality of contacts in a contacts list associated with the first participant, and a first email of a plurality of emails addressed to the first participant.

* * * * *